United States Patent [19]

Matsumoto et al.

[11] Patent Number: 5,251,154
[45] Date of Patent: Oct. 5, 1993

[54] METHOD FOR MEASURING ACCURACY OF THREAD GROOVE AND SYSTEM FOR THE SAME

[75] Inventors: Yasutami Matsumoto, Yamato; Shigemi Tsukamoto, Tsukuba; Takashi Otani, Fujisawa; Kunio Kawashima, Yokohama; Shoji Jibu, Hiratsuka, all of Japan

[73] Assignee: Nippon Seiko Kabushiki Kaisha, Tokyo, Japan

[21] Appl. No.: 611,023

[22] Filed: Nov. 9, 1990

[30] Foreign Application Priority Data

Nov. 9, 1989 [JP] Japan ................... 1-292015

[51] Int. Cl.⁵ ............... G01B 5/20; G01B 7/28; G06F 15/46
[52] U.S. Cl. .............. 364/551.02; 364/560; 33/504; 33/199 R
[58] Field of Search ........... 364/551.02, 551.01, 364/552, 560, 579, 474.37; 33/503, 504, 199 R

[56] References Cited

U.S. PATENT DOCUMENTS

| | | | |
|---|---|---|---|
| 3,047,960 | 8/1962 | Mittenbergs et al. | 33/199 |
| 4,356,556 | 10/1982 | Sterki | 364/560 |
| 4,580,348 | 4/1986 | DeBoynton et al. | 33/199 R |
| 4,672,750 | 6/1987 | Storace et al. | 33/199 R |
| 4,706,360 | 11/1987 | Callens, Jr. et al. | 33/199 R |
| 4,761,891 | 8/1988 | Sugimura | 33/504 |
| 4,852,402 | 8/1989 | Bertz | 364/560 |

FOREIGN PATENT DOCUMENTS 2900896 2/1984 Fed. Rep. of Germany.
3402855 8/1989 Fed. Rep. of Germany.
54-130156 10/1977 Japan.

OTHER PUBLICATIONS

Dr.-Ing. E. Bressel, et al., "Messung von Gewinden auf Koordinatenme Bgeräten", Feingerätetechnik, vol. 29, issue 2; 1980; pp. 73-75.

Primary Examiner—Thomas G. Black
Assistant Examiner—Michael Zanelli
Attorney, Agent, or Firm—Basile and Hanlon

[57] ABSTRACT

In measuring the accuracy of a thread groove of a ball thread formed in a nut by using an electric micrometer, a displacement of one point on each of a pair of flanks of the thread groove is measured along a longitudinal direction of the thread groove, and a pair of measured data sequences are obtained respectively for the pair of flanks. The data elements of the pair of measured data sequences are grouped into a plurality of groups so that each group includes a pair of data elements which are respectively contained in the pair of measured data sequences and which are corresponding to each other. The accuracy in the depth direction of the thread groove with respect to a reference thread groove is obtained on the basis of a sum of the data elements in each group, and the accuracy in the thread axis direction is obtained on the basis of a difference between the data elements in each pair.

12 Claims, 8 Drawing Sheets

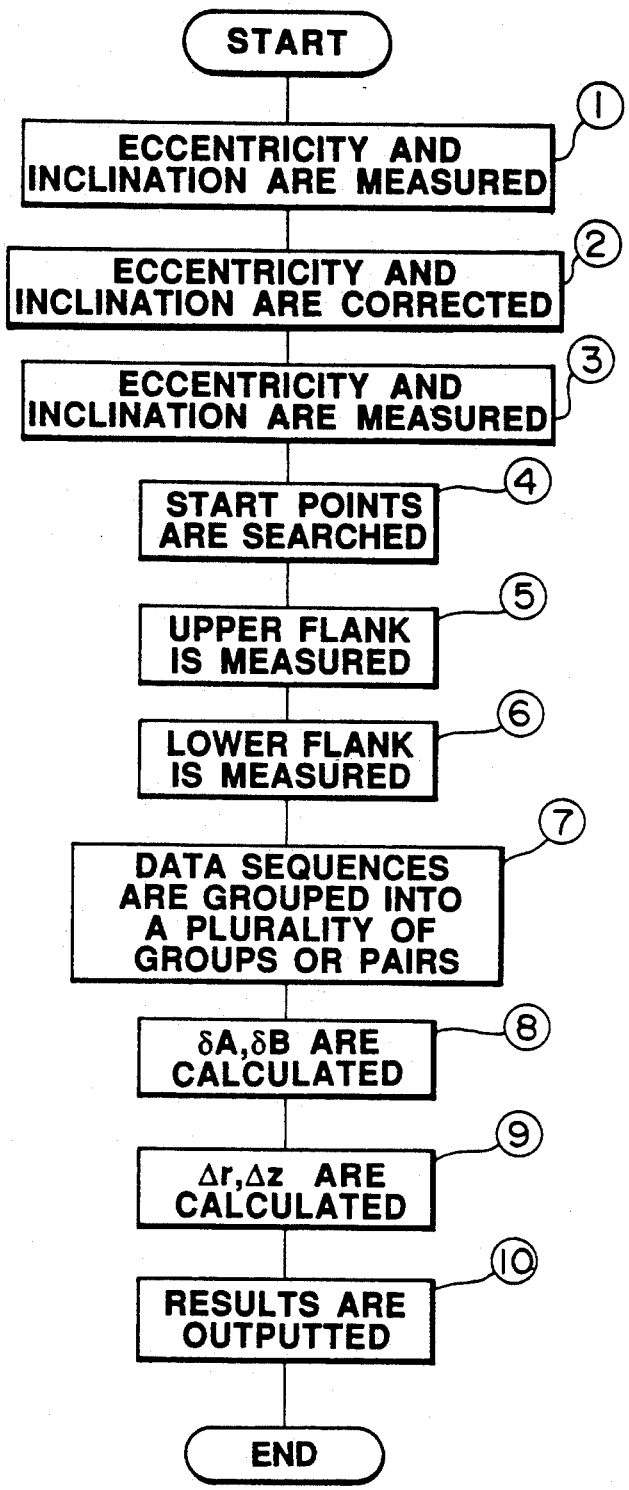

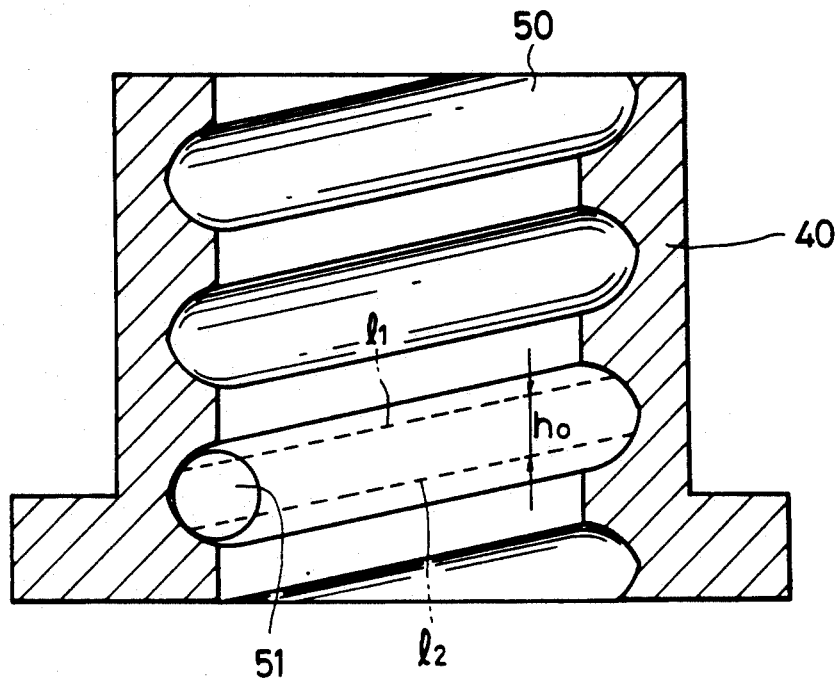
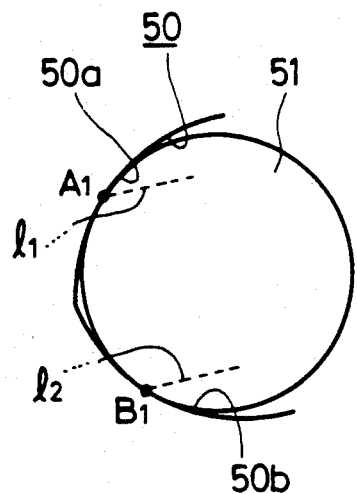
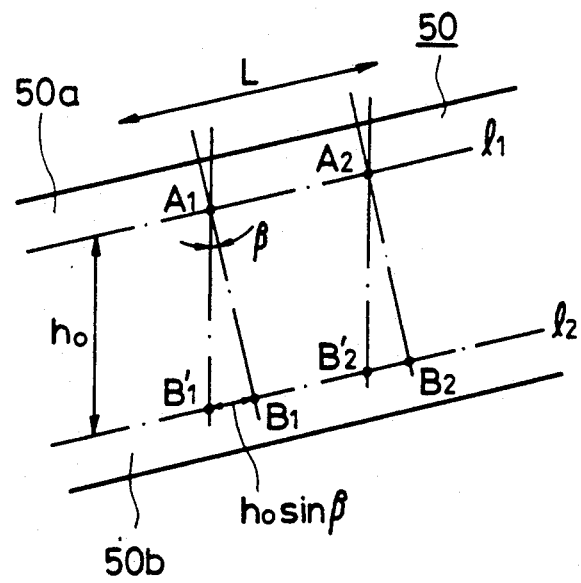

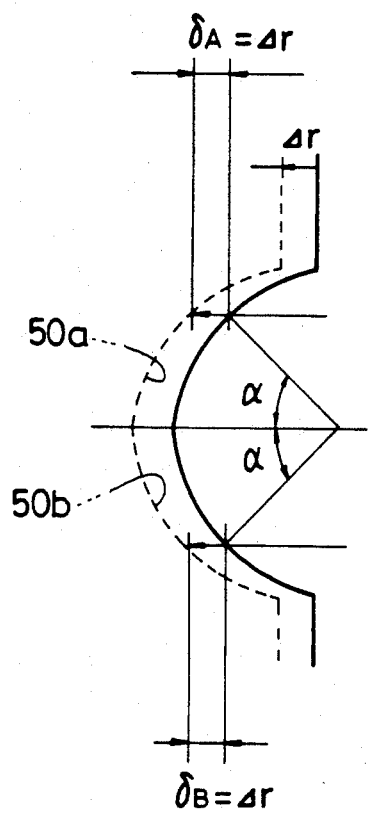
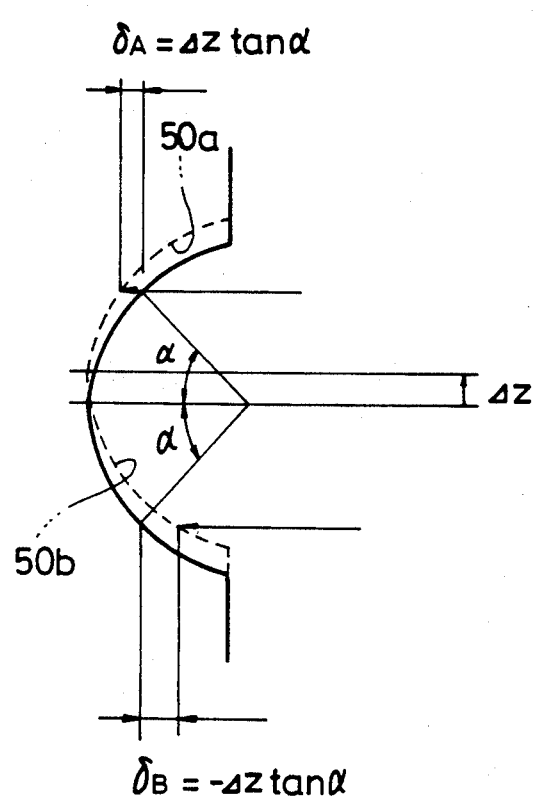

METHOD FOR MEASURING ACCURACY OF THREAD GROOVE AND SYSTEM FOR THE SAME

BACKGROUND OF THE INVENTION

1. Field of the Invention

The present invention relates to a method and an apparatus for measuring the accuracy of a thread groove and to a method for evaluating the accuracy, and in particular, to an improvement in the method and the apparatus in which the accuracy of a thread groove in a depth direction and in a thread axis line direction can be measured by a unidirectional (one-dimensional) detection device, and at the same time, not only the local accuracy of the thread groove but also the overall accuracy can be easily grasped.

2. Description of the Relevant Art

A prior art apparatus is disclosed, for example, in Japanese Patent Laid-Open Publication No. 54-130156 entitled "Automatic Measuring Machine of Thread Elements".

This prior art relates to a measuring machine for measuring elements of a thread such as a pitch, a taper, an effective diameter, an outer diameter and the like, and in this machine, a measuring head includes a minute displacement detector capable of detecting two-dimensional displacement quantity and a contactor connected to the minute displacement detector and in contact with both opposing flanks of a thread groove, and the measuring head is used to measure displacements in a radial direction and in an axial direction over the whole length of the thread groove. Then, each element of the thread is determined on the basis of the results of the measurement. Furthermore, the outer diameter of the thread can be obtained by bringing the contactor of the measuring head into contact with the top of the thread, and by performing a similar measurement.

However, in the prior art machine, since the two-dimensional (in a depth direction and a width direction of a thread groove) displacements have to be detected, a large and expensive two-dimensional minute displacement detector is required. Moreover, in the case of measuring a thread groove, since the contactor must be always in contact with both flanks in order to measure accurately, a high measuring pressure must be applied to the measuring head, and thus, the machine becomes large in size, and as a result, it is not suitable to measure a female thread in which available space is narrow.

Furthermore, in measuring the accuracy of a thread groove, in the case of a nut having a ball thread and a screw shaft, the accuracy of loci of contact points of a ball used therein with both flanks is important, and in the case of outer threads, the accuracy of a position of an effective diameter is important. Accordingly, in order to perform an accurate measurement, it is necessary to prepare and replace with a contactor having a radius size corresponding to a size of the thread. As a result, it is cumbersome, the number of parts is increased, and the apparatus becomes expensive.

Further, a contactor having a predetermined radius size must be used, and this radius size is much larger than minute irregularities of a surface to be measured. Therefore, it is impossible to measure a minute shape of the surface to be measured.

In addition, in the prior art technique, although locally accurate measured data of a thread groove is easily obtained, no method for easily recognizing the overall accuracy is available, and thus, it would further be desirable to develop a method for feeding back the measured data effectively to a manufacturing process.

SUMMARY OF THE INVENTION

The present invention was made in view of the unsolved problems in the prior art technique, and it is an object of the present invention to provide an accuracy measuring method and an accuracy measuring apparatus which are capable of measuring the accuracy in a depth direction and in a thread axis line direction of a thread groove with a one-dimensional displacement measuring device, and to provide an evaluating method of the accuracy which enables feeding back the measured data to a manufacturing process.

In a first embodiment of the present invention, a displacement of one point on each of a pair of flanks constituting a thread groove is measured along a longitudinal direction of the thread groove, and elements of a pair of measured data sequences are grouped into a plurality of groups so that each group includes a pair of elements which are respectively contained in the pair of measured data sequences and which are corresponding to each other. On the basis of a sum of the elements in each group, the accuracy in the depth direction of the thread groove with respect to a reference thread groove is obtained, and on the basis of a difference between the elements in each group, the accuracy in the thread axis line direction of the thread groove with respect to the reference thread groove is obtained.

Here, the depth direction of the thread groove corresponds to the H direction shown in FIGS. 6A and 6B, and it is the same meaning as a radius direction of the thread groove. Further, the longitudinal direction of the thread groove means a direction of extension of the groove itself, or the L direction shown in FIG. 7. The thread axis line direction of the thread groove means an axial direction of a thread main body, and corresponds to a vertical direction in FIGS. 5 or 7.

Supposing that a thread groove is displaced in the depth direction and in the thread axis line direction (that is, an error is present) with respect to a reference thread groove, the displacement in the depth direction results in deviations of a pair of slant surfaces constituting the thread groove in the depth direction, and the displacement in the axis line direction results in deviations of the pair of slant surfaces in the depth direction depending on slant angles of these slant surfaces.

Furthermore, the displacement of the thread groove in the depth direction (the H direction in FIGS. 6A and 6B) appears as deviations of the same magnitude and of the same direction to either of the pair of slant surfaces constituting the thread groove. However, the displacement in the width direction (the W direction in FIGS. 6A and 6B) appears as deviations of opposite directions to each other to these slant surfaces. In this case, however, the magnitude of the deviation in the depth direction caused by the displacement in the thread axis line direction of the thread groove is determined depending on the slant angle of each of the slant surfaces, and if the slant surfaces are planes and the slant angles are equal, the magnitude of the deviations is the same, whereas if the slant surfaces are curved faces and if the displacement is a very small value, the deviations will be of substantially equal magnitude.

Accordingly, as described in the foregoing, when the displacement in the depth direction of each point on the pair of slant surfaces is measured along the longitudinal direction of the thread groove, and the elements of the obtained measured data sequences are grouped so that each group includes a pair of elements of respective measured data sequences positioned in a plane orthogonal to the longitudinal direction, and when the sum of the elements of the group is calculated, since the displacements in the width direction of the pair of slant faces appear as deviations in the depth direction which are opposite to each other, the deviations are canceled by summing these elements.

As a result, the sum of the elements of each group contains only a component of the displacement in the depth direction, and hence, on the basis of the calculation result, the accuracy (error) in the depth direction of the thread groove with respect to the reference thread groove can be obtained.

On the other hand, when the difference between the elements of the grouped pair is calculated, this time, the displacements in the depth direction of the thread groove are canceled, and since the calculated result contains only a component of the displacement in the width direction, the accuracy (error) in the width direction of the thread groove with respect to the reference thread groove can be obtained.

Furthermore, as a standard for grouping the elements in the pair of measured data sequences, for example, two elements which are in the same plane orthogonal to the longitudinal direction of the thread groove are grouped in one group, alternatively, two elements which are in the same cross-section parallel to the thread axis line are grouped in one group.

The standard or method of grouping the elements in the measured data sequences is determined in view of what error is caused depending on the manner of forming the thread groove.

Specifically, in the first method of grouping, it is assumed that the thread groove is formed by cutting in the longitudinal direction. Thus, the elements positioned on the plane orthogonal to the longitudinal direction of the thread groove are grouped as a pair or a group, the error contained in one point on one of both the flanks is the above-described relationship with the error contained in the other point on the other flank, the accuracy in the depth direction or in the thread axis line direction of the thread groove is obtained from the sum or difference between the grouped elements.

Further, in the second method of grouping, it is assumed that the thread groove is formed by dies or the like. Thus, when the elements positioned on the cross-section parallel to the thread axis line are grouped as a pair, similar to the first method, since the error contained in one point on one flank is in the above-mentioned relationship with the error contained in the other point on the other flank, the accuracy in the depth direction or in the thread axis line direction is obtained from the sum or difference between the grouped elements.

Moreover, the points of measurement on both the flanks are selected, for example, so that these points are on the same effective diameter of the thread, or in the case where the thread is formed in an external thread having a ball thread or an internal thread having a ball thread, these points are respectively on loci of a ball on both the flanks. In other words, the selection of positions of the points is determined in view of how the useful accuracy is obtained, and in a normal thread, the accuracy on the effective diameter is important, whereas in the external thread having a ball thread or the internal thread having a ball thread, the accuracy on the loci of the ball is important.

Furthermore, in the case where the points of measurement are selected on the loci of a ball on both the flanks, the coordinates of a plurality of points on each of both flanks are measured along the thread axis line direction, and the coordinates of the plurality of points measured on one flank are compared with the coordinates of the plurality of points measured on the other flank. Two points, having the same radial coordinate whose distance in the thread axis line direction is equal to an axial distance between ball loci on both flanks which is known from a designed size, are selected as measurement starting points on the respective flanks.

More specifically, the positions of the ball loci of both the flanks in the depth direction (the positions in the radial direction) are equal, and the distance in the thread axis line direction between the ball loci on both the flanks is known from the designed size. Accordingly, when the coordinates of a plurality of points on both the flanks are measured, and when the measured coordinates are compared with each other, the two points having the same radial coordinate respectively whose distance in the thread axis line direction is equal to the distance between the two ball loci are respectively on the two ball loci. Thus, when these points are used as the measurement starting points, and the measurement is performed from these points in accordance with a lead angle of the thread groove, the points of measurement can be obtained on the loci of the ball.

In the first embodiment of the invention, as described in the foregoing, the error in the depth direction and the error in the thread axis line direction of the thread groove can be measured with a one-dimensional displacement detecting device. As a result, one of the advantages of the present invention is that, compared with a two-dimensional displacement detecting device, the measuring pressure applied to the detector of the present displacement detecting device may be small, and the one-dimensional displacement detecting device is not very large. Thus, the whole measuring apparatus can be made small in size. Further, even where the space of a measuring section is limited as for an external thread or the like, no difficulty is encountered in the measurement. Still further, since there is no need to replace the contactor of the displacement detecting device depending on the shape and size of the thread groove, the number of parts is small, and since the one-dimensional displacement detecting device is inexpensive as compared with the two-dimensional displacement detecting device, the apparatus can be made inexpensive. Furthermore, since the arbitrary can be performed with a contactor having a radius of an arbitrary size, an error in the shape having a small pitch such as a chatter or the like can be measured.

In a second embodiment of the present invention, after the accuracy of the thread groove in the depth direction and the accuracy of the thread groove in the thread axis line direction with respect to the reference thread groove are obtained in the same manner as in the first embodiment of the invention, an approximate expression of a helix representing the thread groove is obtained from the accuracy in the depth direction and the accuracy in the thread axis line direction by a method of least squares. Then, the accuracy of the thread groove is evaluated based on a difference between the approximate expression of the helix and an expression of a helix representing a locus of the reference thread groove.

In this case, it is preferable to obtain the approximate expression which is similar to the expression representing the locus of the reference thread groove. In other words, if the reference expression is an expression of a helix representing the thread groove, the approximate expression is made also an expression of a helix.

The accuracy of the thread groove is evaluated based on a difference (eccentricity, slant, or the like) between the obtained approximate expression and the reference expression. In this manner, the overall accuracy (average accuracy) of the thread groove, not the local accuracy, is evaluated.

The advantage obtained in the second embodiment is that, since the overall accuracy of the thread groove is evaluated, the result of measurement of accuracy can be fed back effectively to a manufacturing process, and this is very useful to improve the accuracy of the products. In particular, since the overall accuracy between the thread groove and reference plane of the thread can be evaluated, the relationship between the groove and reference plane can be effectively fed back to the manufacturing process.

In a third embodiment of the present invention, a method of evaluation of the accuracy of the thread groove is basically the same as the evaluation method in the second embodiment of the invention. However, the difference resides in that eccentricity and an inclination are measured between an expression of a helix representing a locus of a reference thread groove and a reference plane of the thread, the accuracy of the thread groove with respect to the reference plane of the thread is evaluated on the basis of an approximate expression of a helix representing the thread groove, the expression of the helix representing the locus of the reference thread groove, and the eccentricity and the inclination.

Accordingly, even when the expression of the helix representing the locus of the reference thread groove is not accurately set based on the reference plane of the thread, the accuracy (error) between the thread groove and the reference plane of the thread can be evaluated.

BRIEF DESCRIPTION OF THE DRAWINGS

Other objects and features of the invention will become apparent by reference to the following specification and to the drawings, in which:

FIG. 4 is a flow chart showing an outline of a processing procedure according to an embodiment of the present invention;

FIG. 5 is a front cross-sectional view of the nut having a ball thread in FIG. 1;

FIG. 7 is a diagram for explaining a corresponding relationship between measurement points respectively on upper and lower flanks;

FIG. 8 is a diagram for explaining the points at which a ball is in contact with flanks;

FIG. 10A is a diagram for explaining an error caused in a radial direction in a thread groove;

FIG. 10B is a diagram for explaining an error caused in a lead direction in a thread groove.

DESCRIPTION OF THE PREFERRED EMBODIMENTS

Figure 1:
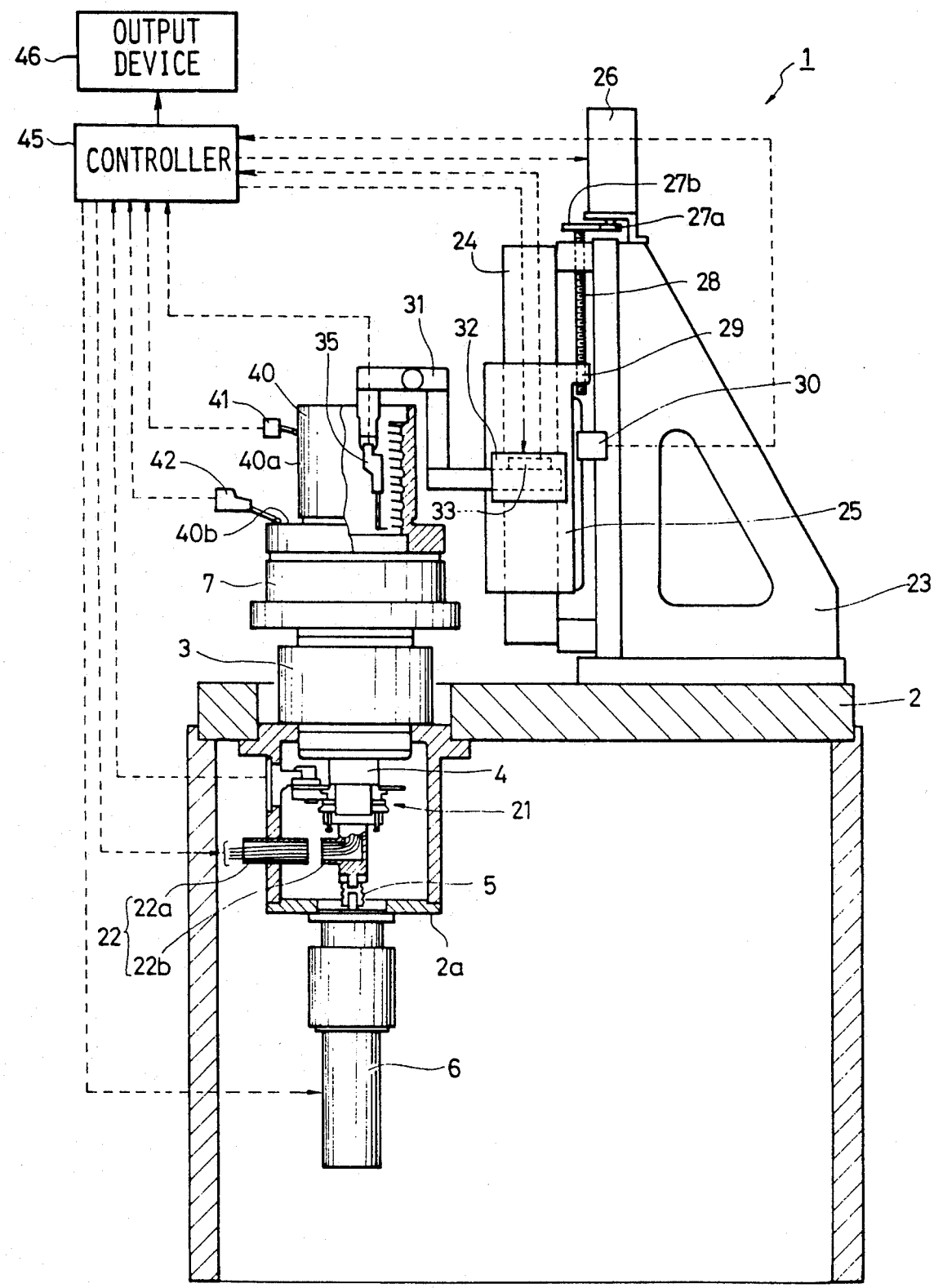
FIG. 1 is a partially cut-away, cross sectional plan view of a thread accuracy measuring apparatus according to an embodiment of the present invention.

FIG. 1 shows a thread accuracy measuring apparatus for automatically measuring the accuracy of a thread groove to which the present invention is applied.

First, the arrangement will be described. The thread accuracy measuring apparatus 1 includes a rotating table unit 3 supported by a box-type bed 2 and having a rotatable spindle 4 penetrating vertically. A lower end of the spindle 4 is connected to an output shaft of a rotating and driving electric motor 6 through a coupling 5. The electric motor is supported by a box member 2a which is fixed to the bed 2 and covers an axial center portion of the spindle 4.

An upper end of the spindle 4 supports a correction table 7 at a position above the rotating table unit 3 so that the correction table 7 is rotatable unitary with the spindle 4. The correction table 7 is used to correct eccentricity and inclination of an object to be measured when the object is attached.

Figure 2:
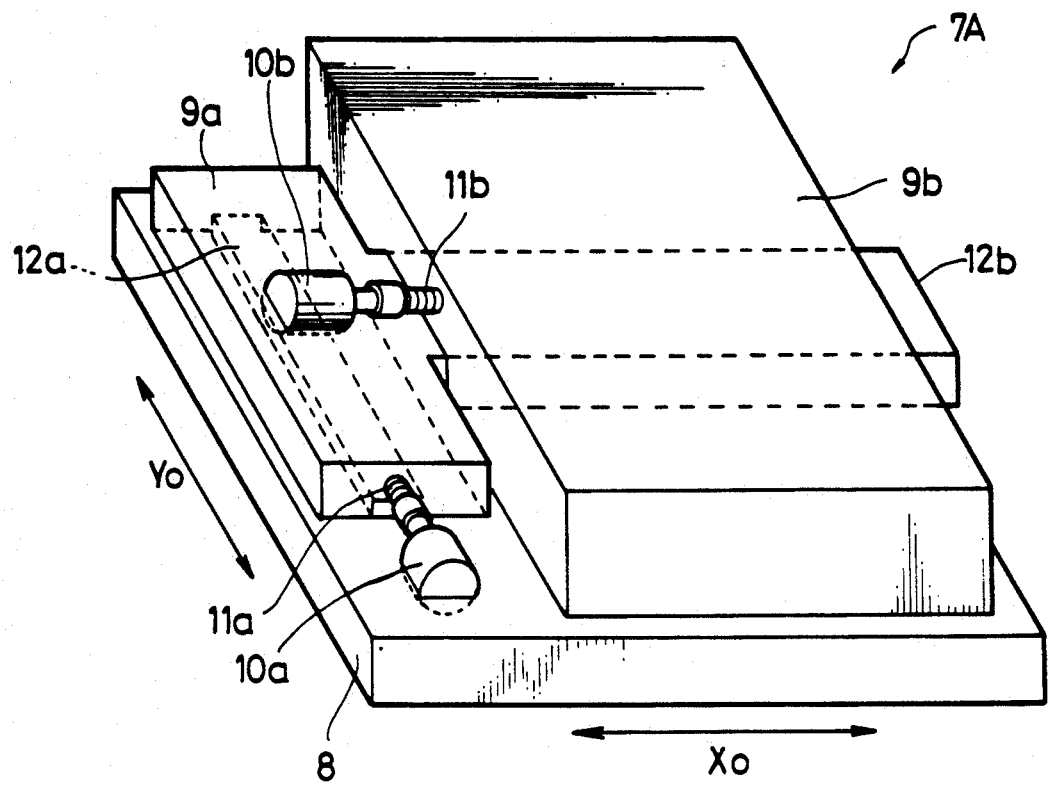
FIG. 2 is a perspective view of the eccentricity correction table in FIG. 1.
Figure 3A:
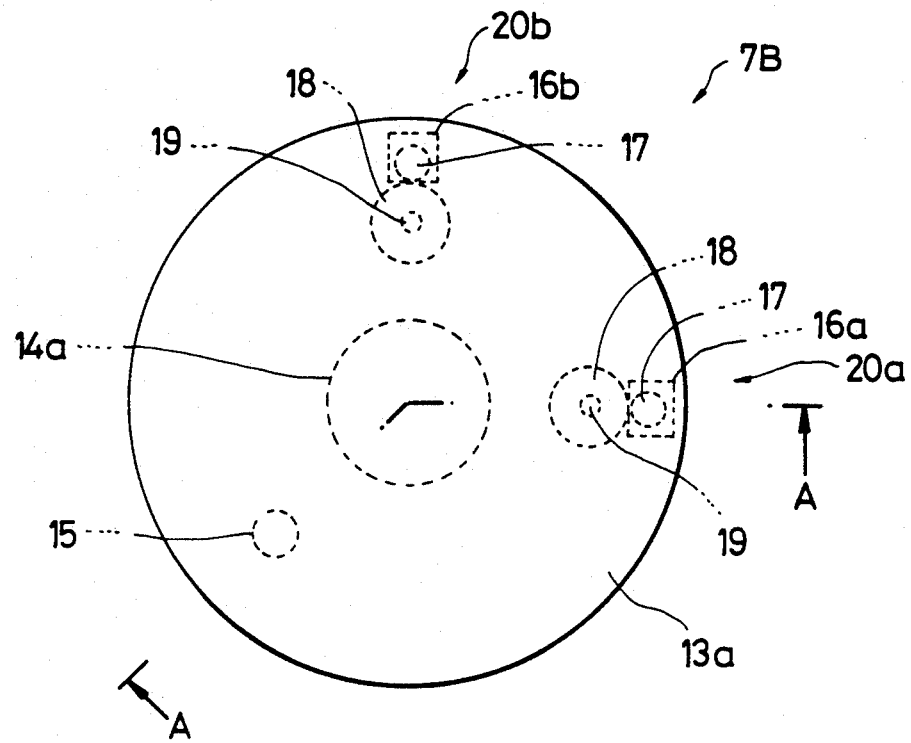
FIG. 3A is a plan view of the inclination adjusting table in FIG. 1.
Figure 3B:
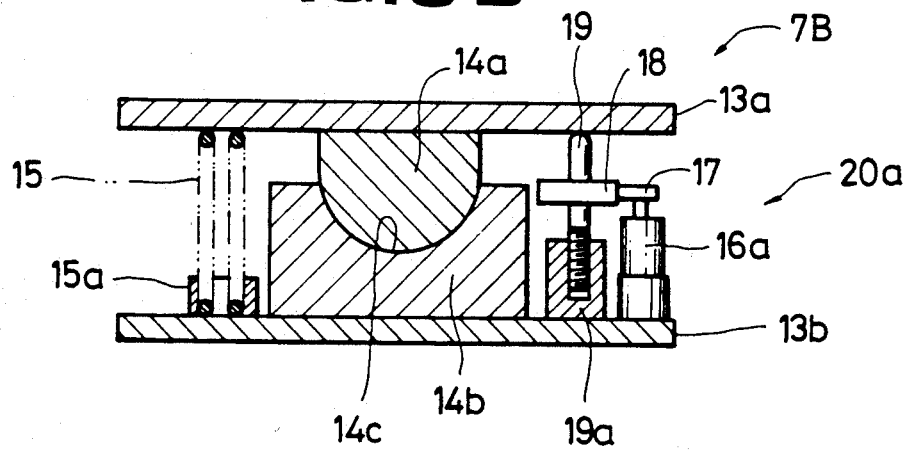
FIG. 3B is a cross-sectional view taken along line A—A in FIG. 3A.

The correction table 7 includes an eccentricity correction table 7A shown in FIG. 2, and a inclination adjusting table 7B shown in FIGS. 3A and 3B. The inclination adjusting table 7B is fixed to an upper surface of the eccentricity correction table 7A to constitute the correction table 7.

As shown in FIG. 2, the eccentricity correction table 7A includes two moving tables 9a and 9b which are slidably disposed on a bottom plate 8, and one moving table 9a is guided by a guide 12a formed on the upper surface of the bottom plate 8 and extending in a direction $Y_0$ in the Figure. At the same time, the moving table 9a is slidable in the direction $Y_0$ with respect to the bottom plate 8 by an electric motor 10a secured to the bottom plate 8, and by a screw shaft 11a connected to a rotating shaft of the electric motor 10a and extending in the direction $Y_0$, and by a ball thread mechanism consisting of a nut (not shown) formed in the moving table 9a and many balls (not shown).

Furthermore, the other moving table 9b is guided by a guide 12b formed integrally with the one moving table 9a extending in a direction $X_0$ in the Figure. At the same time, the moving table 9b is slidable in the direction $X_0$ with respect to the bottom plate 8 by an electric motor 10b secured to the moving table 9a, and by a screw shaft 11b connected to a rotating shaft of the electric motor 10b and extending in the direction $X_0$, and by a ball thread mechanism consisting of a nut (not shown)

formed in the moving table 9b and many rolling balls (not shown).

Accordingly, the moving table 9b moves in the direction $Y_0$ integrally with the moving table 9a by rotation and driving of the electric motor 10a, and at the same time, moves in the direction $X_0$ by rotation and driving of the electric motor 10b. Thus, the moving table 9b can move to an arbitrary position on the bottom plate 8.

On the other hand, the inclination adjusting table 7B includes, as shown in FIGS. 3A and 3B, an upper disk 13a, a lower disk 13b, and a spherical pedestal 14a fixed to a center portion of a lower surface of the upper disk 13a is fitted slidably into a concave recess 14c of a pedestal 14b fixed to a center portion of an upper surface of the lower disk 13b so that both the disks 13a and 13b are oscillatable relative to each other.

A spring 15 and two adjusting screw mechanisms 20a and 20b are disposed angularly spaced from one another in a circumferential direction between the upper disk 13a and the lower disk 13b. The two adjusting screw mechanisms 20a and 20b are spaced from each other in the circumferential direction by 90 degrees.

The spring 15 is held by a spring receiver 15a at a position most spaced from both the adjusting screw mechanisms 20a and 20b in the circumferential direction. The spring 15 biases the upper and the lower disks 13a and 13b in a direction to separate both the upper and lower disks 13a and 13b farther, that is, in a direction to press the upper disk 13a against the adjusting screw mechanisms 20a and 20b.

The adjusting screw mechanisms 20a and 20b respectively includes electric motors 16a and 16b. Small diameter gears 17 are respectively fixed to rotating shafts of the electric motors 16a and 16b. Each small diameter gear 17 engages with a large diameter gear 18 provided on an adjusting screw 19. An upper end of the adjusting screw 19 abuts against the lower surface of the upper disk 13a, and a lower end of the adjusting screw 19 engages with a nut 19a provided on the lower disk 13b so that the adjusting screw 19 can move vertically.

Accordingly, when a rotational driving force of the electric motor 16a or 16b is transmitted to the adjusting screw 19 through the small diameter gear 17 and the large diameter gear 18, the adjusting screw 19 advances or retracts in its axial direction while rotating.

Thus, when the adjusting screw 19 of the adjusting screw mechanism 20a advances and retracts, the upper disk 13a oscillates about an axis which passes through the center of the upper disk 13a and the upper end of the adjusting screw 19 of the adjusting screw mechanism 20b. Similarly, when the adjusting screw 19 of the adjusting screw mechanism 20b advances and retracts, the upper disk 13a oscillates about an axis which passes through the center of the upper disk 13a and the upper end of the adjusting screw 19 of the adjusting screw mechanism 20a.

As a result, the upper disk 13a is allowed to incline at an arbitrary angle with respect to the lower disk 13b.

The correction table 7 is constituted by fixing the lower disk 13b of the inclination adjusting table 7B on an upper surface of the moving table 9b of the eccentricity correction table 7A.

Returning to FIG. 1, a rotary encoder 21 for detecting a rotational position of the spindle 4 is provided within the box member 2a which encloses the spindle 4, and an electric feeding device 22 is provided on a lower side of the rotary encoder 21. The electric feeding device 22 is disconnectable so that it is connected when electric power is supplied to the electric motors 10a, 10b, 16a, and 16b of the correction table 7, and it is disconnected when the spindle 4 is rotating.

The electric feeding device 22 includes a supply side contact 22a movably inserted into the box member 2a and a rotation side contact 22b formed on the spindle 4, and at the time of supplying electric power, the supply side contact 22a is pushed into the rotation side contact 22b to connect therewith, and when the electric power is not supplied, the supply side contact 22a is drawn out and separated from the rotation side contact 22b. The movement of the supply side contact 22a may be performed manually, or automatically by using an air cylinder or the like.

On the bed 2, there is provided a vertical pedestal 23 which supports a vertical shaft 24 in parallel with the spindle 4, and a vertical slide 25 is fitted about the vertical shaft 24 so that the vertical slide 25 is movable up and down along the vertical shaft 24.

The vertical slide 25 can move to an arbitrary position in a vertical direction by a ball thread mechanism which includes a screw shaft 28 extending vertically and coupled with a rotating shaft of an electric motor 26 through gears 27a and 27b, and includes a nut 29 formed integrally with the vertical slide 25 and engaged with the screw shaft 28 through many rolling balls (not shown).

Furthermore, a linear encoder 30 for detecting a vertical position of the vertical slider 25 is provided on the vertical pedestal 23.

An arm 31, which constitutes a part of a measuring mechanism, has a base end supported by the vertical slider 25 so as to enable the arm 31 movable in a horizontal direction, and the arm 31 is moved by a rotation force of an electric motor 32 which is secured to the vertical slider 25, and an advanced or retracted position of the arm 31 is detected by a linear encoder 33 fixed to the vertical slider 25.

The arm 31 has at its extreme end a one-dimensional electric micrometer 35 as a measuring means for detecting a horizontal displacement, and an intermediate portion of the arm 31 is bent in a right-angled shape to prevent collision with the object to be measured.

In this embodiment, it is described as to the case in which the accuracy of a thread groove of a nut 40 having a ball thread is measured as the object to be measured by the thread accuracy measuring apparatus 1. In order to measure the amount of eccentricity and inclination of the nut 40 when the nut 40 is placed on the correction table 7, there is provided a displacement sensor 4 for detecting a radial displacement of a vertical reference surface 40a of the nut 40, and a displacement sensor 42 for detecting a nut 40.

Specifically, if the axis of the nut 40 is aligned with the rotating shaft of the spindle 4, no displacement of the vertical reference surface 40a and the horizontal reference surface 40b will be caused even when the nut 40 is rotated together with the spindle 4. However, if eccentricity is present between the axis of the nut 40 and the rotating shaft of the spindle 4, a displacement of the vertical reference surface 40a will be caused, and if inclination is present between the axis of the nut 40 and the rotating shaft of the spindle 4, displacements of both the vertical reference surface 40a and the horizontal reference surface 40b will be caused. Accordingly, if the displacements of the vertical reference surface 40a and the horizontal reference surface 40b are measured by the displacement sensors 41 and 42, the eccentricity and the inclination of the axis of the nut 40 with respect to the rotation center of the spindle 4 will be detected.

The electric motor 6 for rotating the spindle 4, the electric motors 10a, 10b, 16a, and 16b used for the correction table 7, the electric motor 26 for moving the vertical slider 25 vertically, the electric motor 26 for moving the arm 31 horizontally are controlled by a controller 45. Also, a detected signal of each of the rotary encoder 21 for detecting a rotational portion of the spindle 4, the linear encoder 30 for detecting a vertical position of the vertical slider 25, the linear encoder 33 for detecting a horizontal position of the arm 31, the electric micrometer 35 for measuring a minute displacement of a thread groove as will be described later, and the displacement sensors 41 and 42 for detecting displacements of the reference surfaces 40a and 40b is supplied to the controller 45.

The controller 45 includes a microcomputer, an interface circuit, an A/D converter, a D/A converter, driving circuits of the electric motors, and the like (all not shown), and executes a processing as described later to measure the accuracy of the thread groove of the nut 40 and to output the measured results to an output device 46 such as a printer.

FIG. 4 shows a flow chart of the processing executed by the microcomputer, and the operation of the embodiment will be described hereinafter.

Before executing the processing by the controller 45, the nut 40 as the object to be measured is placed on the correction table 7 so that the axis of the nut 40 is approximately aligned with the rotation center of the spindle 4 and the nut 40 is fixed by magnets or a chuck.

Then, in step 1 in FIG. 4, the eccentricity and the inclination of the nut 40 are measured.

Specifically, the electric motor 6 is driven to rotate the nut 40, and the outputs of the displacement sensors 41 and 42 during the rotation are read. The inclination of the nut 40 is calculated based on a measured value of the displacement sensor 42, and the amount of eccentricity of the nut 40 is calculated based on a value obtained by subtracting a inclination component from a measured value of the displacement sensor 41.

Subsequently, in step 2, the amount of eccentricity and the amount of inclination of the nut 40 obtained in step 1 are corrected so that the axis of the nut 40 is aligned with the rotation center of the spindle 4.

When described more concretely, while monitoring the output of the rotary encoder 21, the energization of the electric motor 6 is interrupted to stop the rotation of the spindle 4 under the condition wherein the supply side contact 22a and the rotation side contact 22b of the electric feeder device 22 are opposing each other. Then, the supply side contact 22a and the rotation side contact 22b are connected with each other. Each of the electric motors 10a, 10b, 16a, and 16b is driven so that the eccentricity correction table 7A and the inclination adjusting table 7B are driven in a direction to correct the amount of eccentricity and the inclination of the nut 40 obtained in step 1.

After completion of the processing of step 2, the program proceeds to step 3, and the eccentricity and the inclination of the nut 40 are measured by executing a similar processing as in step 1 again, and the results are stored in a predetermined memory area in the microcomputer. The step 3 is performed to enable to extract only the accuracy of the thread groove by subtracting the amount of eccentricity and the amount of inclination of the nut 40 measured in step 3 from the accuracy of the thread groove measured later, in such a case where the eccentricity and the inclination of the nut 40 cannot be corrected perfectly in the processing in step 2.

Next, in step 4, a measurement start point within the thread groove of the nut 40 is searched.

Here, in the accuracy of a thread groove, as shown in FIG. 5, the accuracy of loci $l_1$ and $l_2$ of contact points between a thread groove 50 of the nut 40 and a ball 51 which rolls within the thread groove 50 is important, and the measurement start point is selected to be a point on each of the loci $l_1$ and $l_2$.

Because the positions of the loci $l_1$ and $l_2$ in a depth direction (a radial direction of the nut 40) within the thread groove 50 should be equal to each other, and a distance $h_0$ in an axial direction between the loci $l_1$ and $l_2$ is known, the measurement start points on the loci $l_1$ and $l_2$ can be searched in the following manner.

Figure 6A:
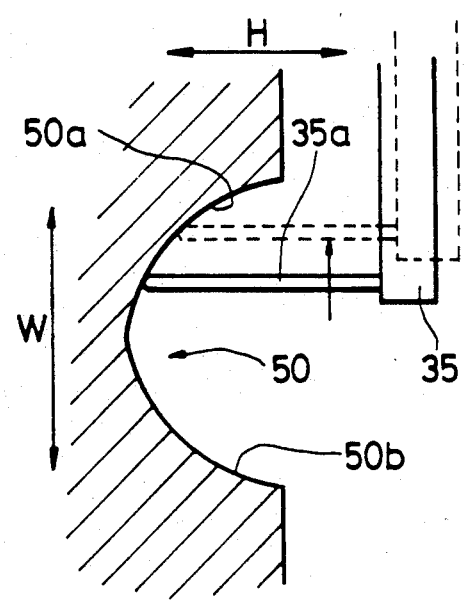
FIG. 6A is a cross-sectional view of a thread groove useful to explain a search method of a measurement start point of an upper flank.
Figure 6B:
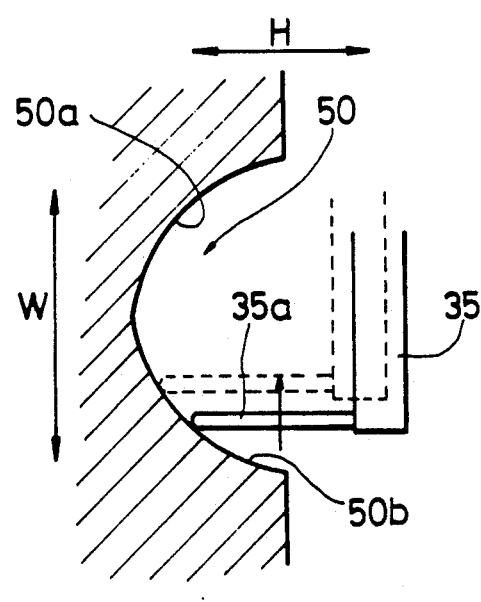
FIG. 6B is a cross-sectional view of a thread groove useful to explain a search method of a measurement start point of a lower flank.

Specifically, as shown in FIG. 6A, a contactor 35a of the electric micrometer 35 is made to oppose an upper end or a lower end of the thread groove 50, and the electric micrometer 35 is gradually moved upwardly by driving the electric motor 26 under a condition where the rotation of the nut 40 (spindle 4) is stopped, and radial positions $r_{11}, r_{12}, \ldots r_{1i}, \ldots, r_{1n}$ at axial positions $z_{11}, z_{12}, \ldots, z_{1i}, \ldots, z_{1n}$ of an upper flank 50a of the thread groove 50 are measured. Similarly, as shown in FIG. 6B, radial positions $r_{21}, \ldots, r_{2i}, \ldots, r_{2n}$ at axial positions $z_{21}, z_{22}, \ldots, z_{2i}, \ldots, z_{2n}$ of a lower flank 50b of the thread groove 50 are measured. Then, those points which satisfy the conditions $r_{1i}=r_{2i}$ and $z_{1i}-z_{2i}=h_0$ are searched. Here, $h_0$ is a distance in the axial direction between the loci $l_1$ and $l_2$.

The points which satisfy the above-mentioned conditions are a point $A_1$ on the locus $l_1$, and a point $B_1'$ on the locus $l_2$ as shown in FIG. 7. These points are selected as the measurement start points, and the coordinates (an axial position, a radial position, and a rotation angle of the nut 40) of these points are stored.

Here, a part of the processing in step 4 and the electric micrometer 35 correspond to coordinate measuring means, and another part of the processing in step 4 corresponds to comparing means and measurement start point selecting means.

After the measurement start points have been obtained in this manner, the program proceeds to step 5, and an actual measurement is performed from the measurement start point $A_1$ on the locus $l_1$ along the locus $l_1$.

Specifically, in a linked relationship with a rotation speed of the electric motor 6 and in accordance with a lead angle $\beta$ of the thread groove 50, the electric motor 26 is driven and the measurement is performed while maintaining a condition in which the contactor 35a of the electric micrometer 35 is always in contact with the locus $l_1$, and data ($\phi$, $r_A$, $Z_A$) is obtained to produce a data sequence on the locus $l_1$. Here, $\phi$ is a rotation angle of the nut 40 detected by the rotary encoder 21, $r_A$ is a measured value of the electric micrometer 35 representing a displacement on the locus $l_1$ in a horizontal direction, and $Z_A$ is an axial position of the electric micrometer 35 detected by the linear encoder 30.

Next, the program proceeds to step 6, an actual measurement is performed similar to step 5 from the measurement start point $B_1'$ on the locus $l_2$, and data ($\phi$, $r_B$, $Z_B$) is obtained to produce a data sequence on the locus $l_2$. Here, $r_B$, and $Z_B$ are similar to $r_A$, and $Z_A$ described above. Here, the processings in steps 5 and 6 correspond to data measuring means, and the electric motor 26 and the vertical slider 25 correspond to contactor moving means.

The program proceeds to step 7, and elements of respective data sequences obtained in steps 5 and 6 are grouped into pairs or groups of elements so that each pair or each group includes elements respectively selected from the two data sequences.

Specifically, the ball 51 rolls within the thread groove 50 while being in contact with the groove surface at two points respectively on the loci $l_1$ and $l_2$ at the same time. The two simultaneous contact points are, as shown in FIGS. 7 and 8, positioned on a line which is othogonal to a direction of travel (a longitudinal direction of the groove 50, i.e., a direction L in FIG. 7) of the ball 51. In the case of the ball thread, in order that the ball 51 rolls smoothly, the accuracy of the two points on the loci $l_1$ and $l_2$ at which the ball 51 is simultaneously in contact with the thread groove 50 is important. In this respect, the two points at which the ball 51 is simultaneously in contact with the thread groove 50 are at portions which are cut at the same time when the thread groove 50 is formed.

Accordingly, the two points at which the ball 51 is simultaneously in contact with the thread groove 50, that is, the two points which are respectively on the data sequences respectively obtained for the loci $l_1$ and $l_2$ are selected and grouped into a pair or a group.

The grouping may be performed after all measurements for the loci $l_1$ and $l_2$ have been completed, or may be performed in parallel with the measurement for the locus $l_2$. For example, supposing that the ball 51 is in contact with the measurement start point $A_1$, at the same time, the ball 51 is in contact with a point $B_1$ at which a straight line passing through the point $A_1$ and orthogonal to the locus $l_1$ intersects the locus $l_2$. This point $B_1$ is at a position which is spaced from the measurement start point $B_1'$ by $h_0 \sin \beta$ in a rising direction along the locus $l_2$.

Accordingly, at the time of measurement of the lower flank 50b by the electric micrometer 35, if the point $B_1$ is selected as a new measurement start point, and if the measurement for the locus $l_2$ is carried out at the same pitch as the measurement for the locus $l_1$, and if the grouping of data is carried out in the order of measurement, a desired grouping will be achieved easily such as $A_1$ and $B_1$, $A_2$ and $B_2$, and the like.

After the grouping is completed, the program proceeds to step 8 and the designed values of the loci $l_1$ and $l_2$ which are used as a reference are subtracted from data measured in the steps 5 and 6 and horizontal deviations $\delta_A$ and $\delta_B$ (i.e., horizontal displacements of the loci $l_1$ and $l_2$) of respective loci $l_1$ and $l_2$ are obtained.

Figure 9A:
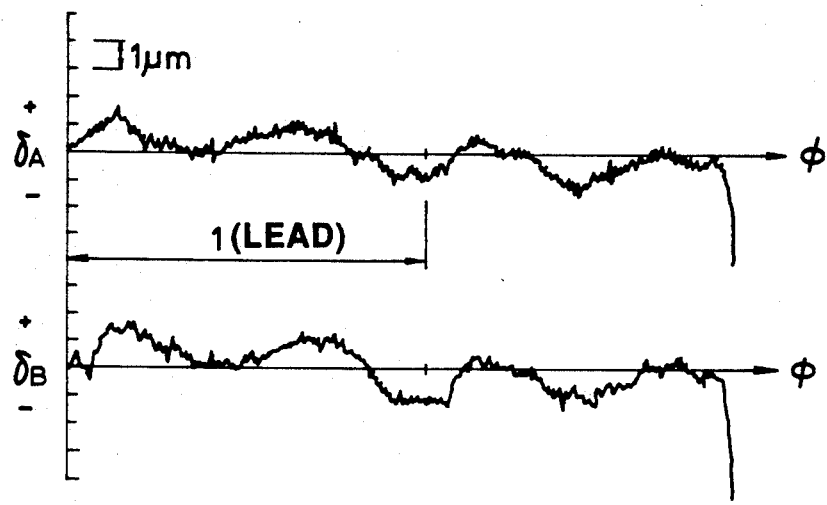
FIG. 9A is a graph showing an example of the result of measurement in accordance with an embodiment of the invention.

FIG. 9A shows an example of calculated results of the deviations $\delta_A$ and $\delta_B$.

Next, the program proceeds to step 9, and a local error in a radial direction $\Delta r$ and a local error in a lead direction $\Delta z$ of the thread groove 50 are calculated with the following equations.

$$\Delta r = \frac{\delta_A + \delta_B}{2} \quad (1)$$

$$\Delta z = \frac{\delta_A - \delta_B}{2 \tan \alpha} \quad (2)$$

Where, $\delta_A$ and $\delta_B$ are a pair or a group of data whose correspondence was established in step 7, and $\alpha$ represents a contact angle of the ball 51 with the upper flank 50a and the lower flank 50b (FIG. 10).

Here, it will be explained why the radial error $\Delta r$ and the error in the lead direction $\Delta z$ can be obtained on the basis of the above-mentioned equations (1) and (2).

First, supposing that the radial error $\Delta r$ has been caused at an arbitrary position in the longitudinal direction of the thread groove 50, and as shown in FIG. 10A, a displacement as shown by the broken line has been caused with respect to a reference thread groove shown by the solid line. Then, a displacement having the same direction and the same magnitude as the radial error $\Delta r$ is caused for each of the upper flank 50a and the lower flank 50b.

Furthermore, supposing that the error $\Delta z$ in the lead direction has been caused at an arbitrary position in the longitudinal direction of the thread groove 50, and as shown in FIG. 10B, a displacement as shown by the broken line has been caused with respect to a reference thread groove shown by the solid line. Then, radial displacements having respectively different directions are caused for the upper flank 50a and the lower flank 50b, and both the displacements have the same magnitude of $\Delta z \tan \alpha$.

In this respect, in FIG. 10B, the errors in the lead direction are drawn as being larger than actual errors for the sake of explanation, and thus, deviations $\delta A$ and $\delta B$ drawn in different magnitude in FIG. 10B. However, actually, since the error $\Delta z$ in the lead direction is sufficiently smaller than a radius of curvature of the upper and lower flanks 50a and 50b, the radial displacements of the upper and lower flanks 50a and 50b caused by the error $\Delta z$ in the lead direction may be considered as being equal to each other. It goes without saying that these displacements are entirely equal when a slant surface of the thread groove 50 is a plane.

From this, supposing that both the radial error $\Delta r$ and the error $\Delta z$ in the lead direction have been caused in the thread groove 50, the deviations $\delta A$ and $\delta B$ measured by the electric micrometer 35 can be expressed as in the following equations (3) and (4).

$$\delta_A \Delta r + \Delta z \tan \alpha \quad (3)$$

$$\delta_B \Delta r - \Delta z \tan \alpha \quad (4)$$

Thus, when the equations (3) and (4) are solved with respect to $\Delta r$ and $\Delta z$, the above-mentioned equations (1) and (2) are obtained.

Figure 9B:
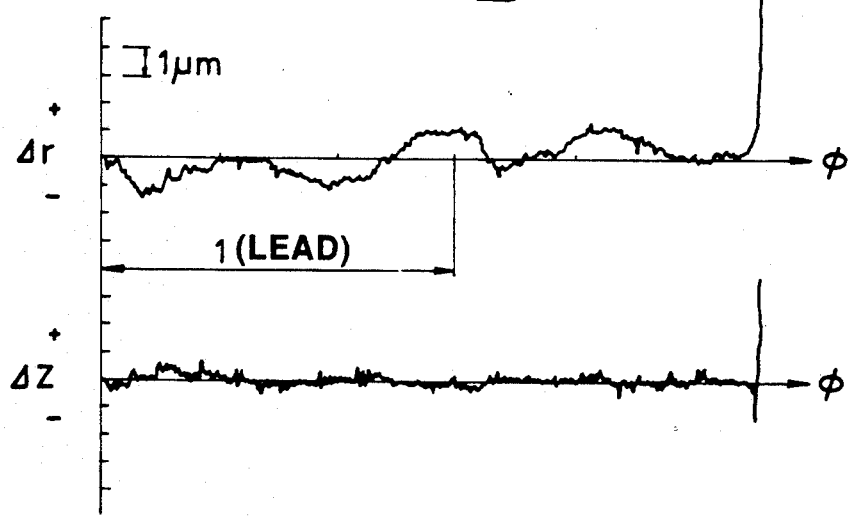
FIG. 9B is a graph showing an example of the result of calculation in accordance with an embodiment of the invention.

FIG. 9B shows the radial error $\Delta r$ and the error $\Delta z$ in the lead direction obtained on the basis of the deviations $\delta_A$ and $\delta_B$ shown in FIG. 9A.

In step 10, the graphs as shown in FIGS. 9A and 9B are outputted to an output device 46 such as a printer, a CRT, or the like so that the local accuracy of the thread groove 50 can be easily recognized. (However, in the measurement in step 3, if the amount of eccentricity and the amount of inclination of the nut 40 have been measured, it is necessary to subtract these amounts. As will be described later, in the case of evaluation the overall accuracy of thread groove 50, the amount of eccentricity and the amount of inclination may be subtracted from the final evaluation result.)

In this connection, in the case of this example, it will be seen that the upper and lower flanks 50a and 50b have a roundness shape of the same phase. Further, the error $\Delta z$ in the lead direction is substantially zero, and at the same time, the radial error Δr is large. Since two protruding portions are recognized within one lead, it will be seen that an error having an elliptical component is contained. The processing in step 7 corresponds to grouping means, the processing in step 8 corresponds to radius direction error detecting means, the processing in step 9 corresponds to screw axis line direction error detecting means, the processing in step 10 and the output device 46 correspond to outputting means, and the processing in steps 7-10 and the output device 46 correspond to data outputting means.

As described above, in the thread accuracy measuring apparatus 1 in this embodiment, the radial error Δr and the error Δz in the lead direction of the thread groove 50 can be measured by the one-dimensional electric micrometer 35.

Accordingly, as compared with the case where a two-dimensional displacement detector is used, it is allowed to apply a small measuring pressure to the electric micrometer 35, and since the one-dimensional electric micrometer 35 is not so large, the overall apparatus can be made small in size. As a result, even when the space for measurement is limited, as in a female thread, the measurement can be performed without difficulty.

Furthermore, since there is no need to replace the contactor 35a of the electric micrometer 35 depending on the shape and size of the thread groove 50, the number of parts is small. Thus, the one-dimensional displacement detector is inexpensive as compared with the two-dimensional displacement detector. Therefore, this thread accuracy measuring apparatus 1 can be formed more inexpensively, as compared with the prior art apparatus.

Moveover, since the contactor 35a has the tip end of an arbitrary size of radius, it is possible to measure a shape error of minute pitch such as a chatter or the like.

Next, a method will be described for evaluating the overall accuracy of the nut 40 by utilizing the local accuracy obtained by the thread accuracy measuring apparatus 1.

The radial error Δr and the error Δz in the lead direction obtained in step 9 are local errors of the thread groove 50, and these errors do not represent the overall accuracy of the thread groove 50. In other words, it is impossible to judge the amount of eccentricity and the amount of inclination between the thread groove 50 of the measured nut 40 and the reference surfaces 40a and 40b.

For this reason, even when the radial error Δr and the error Δz in the lead direction of an initial product are obtained, it had been impossible to effectively feed back the measured result to a manufacturing process.

The inventors of the present invention reached the concept that the overall accuracy of the thread groove 50 can be evaluated by obtaining an approximate expression representing a locus of the measured thread groove 50 based on the obtained radial error Δr and the error Δz in the lead direction, and by comparing the approximate expression with an expression representing a locus of a reference thread groove (there is entirely no eccentricity and inclination with respect to the reference surfaces 40a and 40b). Hereinafter, a concrete procedure of the evaluation method will be described.

The locus of the reference thread groove, that is, a reference helicoidal curve, is expressed by the following equations (5) and (6) when it is represented by the cylindrical coordinates R—ϕ—Z, where, a radius of a nominal size is $R_0$, and a lead is $l_0$.

$$R = R_0 \tag{5}$$

$$Z = l_0 \times \phi / 2\pi \tag{6}$$

Figure 11:
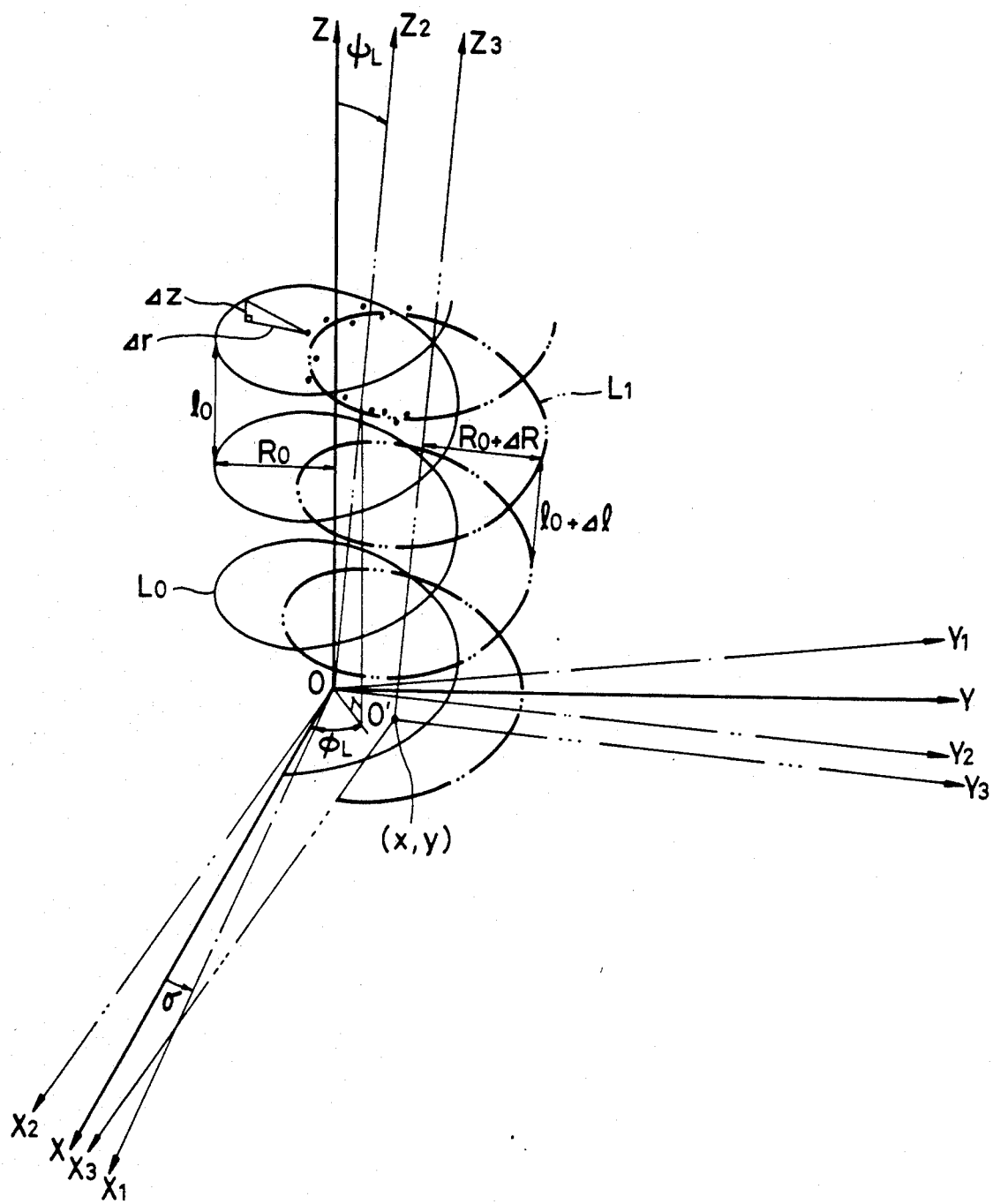
FIG. 11 is a diagram for explaining a relationship between a reference helicoidal curve and a helicoidal curve obtained by approximating two measuring points.

When this curve is drawn on the three-dimensional rectangular coordinates of X Y Z, this curve is shown by a helicoidal curve $L_0$ in FIG. 11.

Now, supposing that the locus of the thread groove 50 as shown by a helicoidal curve $L_1$ of the chain line in FIG. 11 is eccentric and inclines with respect to the reference helicoidal curve $L_0$, that is, the helicoidal curve $L_1$ is eccentric by (x, y) with respect to the origin 0 and inclines by $\phi_L$ in a direction $\phi_L$, and thus, a lead error Δl, and a radial error $\Delta_R$, and a phase error σ are involved, the equations which represent the curve $L_1$ are expressed as the following equations (7) and (8). In FIG. 11, in order that the difference between both the curves $L_0$ and $L_1$ is clear, the curves are shown by a rotation and a movement of the coordinate system. That is, the $0 X_1 Y_1 Z$ coordinate system is formed by rotating the 0 X Y Z coordinate system on the X Y plane by an angle σ, and further, the $0 X_2 Y_2 Z_2$ coordinate system is formed by slanting the Z axis of the $0 X_1 Y_1 Z$ coordinate system in a direction $\phi_L$ by an angle $\phi_L$ and further, the $0' X_3 Y_3 Z_3$ coordinate system is formed by moving the origin 0 of the $0 X_2 Y_2 Z_2$ coordinate system by (x, y) on the X Y plane. Accordingly, this $0' X_3 Y_3 Z_3$ coordinate system is a coordinate system which passes through the axis of the curve $L_1$.

$$R = R_0 + \Delta R + \tag{7}$$
$$\frac{\theta}{2\pi}(l_0 + \Delta l)(\phi_L \cos\phi\, \phi_L \cos\phi + \phi_L \sin\phi_L \sin\phi) +$$
$$(x\cos\phi + y\sin\phi)$$

$$Z = \frac{\theta}{2\pi}(l_0 + \Delta l) \tag{8}$$
$$R_0(\phi_L \cos\phi_L \cos\phi + \phi_L \sin\phi_L \sin\phi)$$

Here, $$\theta = \frac{(R_0 + \Delta R)(\phi + \sigma) + x\sin\phi - y\cos\phi}{R_0 + \Delta R - \frac{l_0}{2\pi}(\phi_L \cos\phi_L \cos\phi - \phi_L \sin\phi_L \sin\phi)}$$

where, θ represents an angle when advancing on the helicoidal curve L1 to be obtained.

Here, a point sequence of (ϕ, γ, ζ) will be acquired from the relationship of $$\gamma = R_0 + \Delta r, \quad \zeta = (\phi/2\pi) l_0 \Delta z$$

in accordance with the point sequence of data (ϕ, Δr, Δz) obtained in the step 9 (refer to FIG. 9B).

When this point sequence of (ϕ, γ, ζ) is plotted on the X Y Z coordinate system, black dots as shown in FIG. 11 are obtained. Since these black dots are a point sequence obtained along the thread groove 50, they are drawn substantially on a helicoidal curve.

Then, the point sequence (ϕ, γ, ζ) is substituted in the equations (7) and (8), and by applying a method of least squares, unknowns x, y, $\phi_L$, $\phi_L$, Δl, $\Delta_R$ and σ are obtained, and an approximate expression of a curve drawn by the point sequence $(\phi, \gamma, \zeta)$ is obtained.

Once the approximate expression is obtained, since (x, y) represents an average amount of eccentricity of the thread groove 50 with respect to the reference coordinate system, and $(\phi_L, \phi_L)$ represents an average inclination direction and an average amount of inclination of the thread groove 50 with respect to the reference coordinate system, when the amount of eccentricity and the amount of inclination of the reference surfaces 40a and 40b with respect to the reference coordinate system are subtracted from the (x, y) and $(\phi_L, \phi_L)$ an average inclination direction of eccentricity and an average amount of eccentricity inclination of the thread groove 50 with respect to the reference surfaces 40a and 40b can be obtained. Here, $\Delta l$ represents an average lead error of the thread groove 50, and $\Delta_R$ represents an average radius error of the thread groove 50. Further, if a new helicoidal curve is obtained beforehand by transforming the above-mentioned equations, (5) and (6) based on the amount of eccentricity and the amount of inclination of the reference surfaces 40a and 40b with respect to the reference coordinate system, the average inclination direction of eccentricity and the average amount of inclination of eccentricity of the thread groove 50 with respect to the reference surfaces 40a and 40b can be obtained only by comparing the new helicoidal curve with the helicoidal curve $L_1$.

Since the direction of reducing the errors between the thread groove 50 and the reference surfaces 40a and 40b can be determined easily from the average values as mentioned above, if the result is fed back to the manufacturing process, it will be very useful to improve the accuracy of the nut 40.

For example, when it is evaluated that the eccentricity and the inclination with respect to the reference surfaces are large, it can be judged that the chucking accuracy to a working machine is poor, and further, when it is evaluated that the axial accuracy is not satisfactory, it can be determined that the feeding accuracy of a machine tool during manufacture must be improved.

In the above embodiment, the electric micrometer 35 corresponds to a measuring means, the processing in the step 7 corresponds to a grouping means, the processing of the equation (1) in the step 9 corresponds to radius direction error detecting means, and the processing of the equation (2) in the step 9 corresponds to a screw axis line direction error detecting means.

While, in the above embodiment, the present invention is applied to the apparatus for measuring the accuracy of the thread groove 50 of the ball thread having a cross-section of a Gothic arch, the present invention is not limited to this application for measuring the accuracy.

For example, even a thread groove of a nut having a ball thread of a single are shape can be measured. In this case, since a ball is in contact with a thread surface only at one flank surface, a measuring point of the other flank may be selected on a line which passes through a contact point between the other flank surface and a line which crosses the ball locus on the one flank and which is in parallel with the rotating shaft of the nut. Thus, the present invention can be applied.

Furthermore, the present invention is applicable to a groove having a cross section of a triangular shape or a trapezoidal shape in which a flank formed by a slant surface is a plane. Further, when the groove is a thread groove of a male thread or a female thread, it is preferable to select the measuring point along the effective diameter.

Another example in which the accuracy can be measured in accordance with the present invention, includes a race surface of a bearing. In the prior art measurement of the accuracy, the measurement has been carried out on the bottom of a groove (a position of a maximum diameter), and thus, although the radial accuracy can be determined, the axial accuracy (i.e., in a width direction of the groove) cannot be determined. In the present invention, the radial as well as axial accuracy can be measured by performing the processing as described in the foregoing, and thus, weaving or parallelism of the race surface can be evaluated.

Moreover, not only the measurement of the accuracy of the thread groove but also the accuracy of a ridge such as a thread or the like can be measured by utilizing the present invention. That is, when a similar measurement as in the embodiment is performed as to the slant surfaces constituting the ridge, and when a similar calculation and processing is carried out as to the measured result, it is possible to evaluate the accuracy in a thickness direction (a height direction) and the accuracy in a width direction of the ridge.

In the above embodiment, it is described as to the case in which the measured data is grouped into groups or pairs so that two measuring points which are in a plane orthogonal to a longitudinal direction of a thread groove are grouped into the same group or the same pair. However, in the case of a thread groove which is formed by dies or the like, it is preferable to group two measuring points (in FIG. 7, $A_1$ and $B_1'$, $A_2$ and $B_2'$) which are in a plane parallel to a thread axis line into the same group or the same pair. Because, when the thread groove is formed by the dies, since the thread groove is formed in parallel to the thread axis line regardless of a lead angle of the thread groove, the deviations $\delta_A$ and $\delta_B$ which are canceled out by the above-mentioned equations (1) and (2) are contained in measured data at positions located in a plane parallel to the thread axis line.

Furthermore, in the above embodiment, the eccentricity and the inclination of the nut 40 which is the object to be measured are measured by the two displacement sensors 41 and 42. However, the eccentricity and the inclination can be obtained by measuring a displacement of an outer diameter at two positions in a height direction of the vertical reference surface 40a of the nut 40 by the electric micrometer 35, and by calculating and processing the measured result.

Moreover, in the above embodiment, the measurement as to the upper and lower flanks 50a and 50b is performed by the single electric micrometer 35. However, the measurement as to the upper and lower flanks 50a and 50b can be performed simultaneously, for example, by providing two electric micrometers on the extreme end of the arm 31, and at the same time, by adjusting an axial distance between the two electric micrometers to be the distance $h_0$.

In addition, in the case of measuring the accuracy of a groove of a taper thread by the thread accuracy measuring apparatus, the accuracy of the taper thread can be measured, in the processing in the above-mentioned steps 5 and 6 by advancing and retracting the arm 31 in a horizontal direction by driving the electric motor 32 in accordance with a rising speed of the vertical slider 24 which is detected by the linear encoder 30 and in accordance with a taper angle of the thread to be measured.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method for measuring the accuracy of a threaded groove in one of an external thread having a ball thread and an internal thread having a ball thread, the method comprising the steps of:
   measuring the coordinates of a plurality of points on each of a pair of flanks along a thread axis line direction;
   comparing the coordinates of the plurality of points measured on one flank with the coordinates of the plurality of points measured on the other flank;
   selecting, as measurement starting points on said respective flanks, two points having the same radial coordinate whose distance in the thread axis line direction is equal to an axial distance between ball loci on said pair of flanks, said distance being known from a designed size;
   measuring a displacement in a depth direction of one point on each of said pair of flanks constituting the thread groove by moving the position of the one point along a longitudinal direction of the thread groove, and obtaining a pair of measured data sequences, the one point selected on a locus of a ball on each of the pair of flanks, the one point being a point of measurement;
   grouping elements of said pair of measured data sequences into a plurality of groups so that each group includes a pair of elements which are respectively included in the pair of measured data sequences and which are corresponding to each other;
   obtaining the accuracy in the depth direction of the thread groove with respect to a reference thread groove on the basis of a sum of the elements in each group; and
   obtaining the accuracy in the thread axis line direction of the thread groove with respect to the reference thread groove on the basis of a difference between the elements in each group.

2. An apparatus for measuring the accuracy of a thread groove in one of an external thread having a ball thread and an internal thread having a ball thread, the apparatus comprising:
   means for measuring a displacement in a depth direction of one point on each of a pair of flanks constituting the thread groove by moving the position of the one point along a longitudinal direction of the thread groove, and obtaining a pair of data sequences, the measuring means selecting the one point on each of said pair of flanks, said one point selected on a locus of a ball on each of said pair of flanks, said one point being a point of measurement;
   means for grouping elements of said pair of measured data sequences into a plurality of groups so that each group includes a pair of elements which are respectively included in the pair of measured data sequences and which are corresponding to each other;
   first calculating means for obtaining the accuracy in the depth direction of the thread groove with respect to a reference thread groove on the basis of a sum of the elements in each group;
   second calculating means for obtaining the accuracy in a thread axis line direction of the thread groove with respect to the reference thread groove on the basis of a difference between the elements in each group;
   means for measuring the coordinates of a plurality of points on each of said pair of flanks along the thread axis line direction;
   means for comparing the coordinates of the plurality of points measured on one flank with the coordinates of the plurality of points measured on the other flank; and
   means for selecting measurement starting points, said measurement starting points being two points having the same radial coordinate whose distance in the thread axis line direction is equal to an axial distance between ball loci on said pair of flanks, said distance being known from a designed size.

3. A method for evaluating the accuracy of a thread groove in one of an external thread having a ball thread an internal thread having a ball thread, the method comprising the steps of:
   measuring the coordinates of a plurality of points on each of a pair of flanks along a thread axis line direction;
   comparing the coordinates of the plurality of points measured on one flank with the coordinates of the plurality of points measured on the other flank;
   selecting, as measurement starting points on said respective flanks, two points having the same radial coordinate whose distance in the thread axis line direction is equal to an axial distance between ball loci on said pair of flanks, said distance being known from a designed size;
   measuring a displacement in a depth direction of one point on each of said pair of flanks constituting the thread groove by moving the position of the one point along a longitudinal direction of the thread groove, and obtaining a pair of measured data sequences;
   grouping elements of said pair of measured data sequences into a plurality of groups so that each group includes a pair of elements which are respectively included in the pair of measured data sequences and which are corresponding to each other, said one point on each of said pair of flanks being selected on a locus of a ball on each of said pair of flanks, said one point being a point of measurement;
   obtaining the accuracy in the depth direction of the thread groove with respect to a reference thread groove on the basis of a sum of the elements in each group;
   obtaining the accuracy in the thread axis line direction of the thread groove with respect to the reference thread groove on the basis of a difference between the elements in each group;
   obtaining an approximate expression of a helix representing a locus of the thread groove by a method of least squares based on the accuracy in the depth direction and the accuracy in the thread axis line direction; and
   evaluating the accuracy of the thread groove with respect to said reference surface of the thread based on said approximate expression of the helix, said expression of the helix representing the locus of said reference thread groove, and said amount of eccentricity and said inclination.

4. A method for evaluating the accuracy of a thread groove in one of an external thread having a ball thread and an internal thread having a ball thread, the method comprising the steps of:

measuring the coordinates of a plurality of points on each of a pair of flanks along a thread axis line direction;

comparing the coordinates of the plurality of points measured on one flank with the coordinates of the plurality of points measured on the other flank;

selecting, as measurement starting points on said respective flanks, two points having the same radial coordinate whose distance in the thread axis line direction is equal to an axial distance between ball loci on said pair of flanks, said distance being known from a designed size;

measuring a displacement in a depth direction of one point on each of said pair of flanks constituting the thread groove by moving the position of the one point along a longitudinal direction of the thread groove, and obtaining a pair of measured data sequences, said one point on each of said pair of flanks being selected, on a locus of a ball on each of said pair of flanks, said one point being a point of measurement;

grouping elements of said pair of measured data sequences into a plurality of groups so that each group includes a pair of elements which are respectively included in the pair of measured data sequences and which are corresponding to each other;

obtaining the accuracy in the depth direction of the thread groove with respect to a reference thread groove on the basis of a sum of the elements in each group;

obtaining the accuracy in the thread axis line direction of the thread groove with respect to the reference thread groove on the basis of a difference between the elements in each group;

measuring an amount of eccentricity and an inclination between an expression of a helix representing a locus of said reference thread groove and a reference surface of the thread;

obtaining an approximate expression of a helix representing a locus of the thread groove by a method of least squares based on the accuracy in the depth direction and the accuracy in the thread axis line direction; and evaluating the accuracy of the thread groove with respect to said reference surface of the thread based on said approximate expression of the helix, said expression of the helix representing the locus of said reference thread groove, and said amount of eccentricity and said inclination.

5. A method of measuring the accuracy of a thread groove of a screw including a nut having a ball thread and a screw shaft having an external thread, the method comprising the steps of:

measuring the coordinates of a plurality of points on each of a pair of flanks of the thread groove along a screw axis line direction;

comparing the coordinates of the plurality of points on one flank with the coordinates of the plurality of points on the other flank;

selecting, as measurement starting points on the respective flanks, two points respectively on one flank and on the other flank, a distance between the two points in the screw axis line direction being equal to a predetermined axial distance between ball loci on the pair of flanks, the two points having an equal radial distance from the screw axis line;

measuring a displacement in a depth direction of one point on each of the pair of flanks by moving the position of the one point along a longitudinal direction of the thread groove by means of a one-dimensional displacement detector starting from a corresponding one of the two measurement starting points to thereby obtain a first measured data sequence and a second measured data sequence respectively corresponding to the points on the pair of flanks;

grouping the first measured data sequence and the second measured data sequence into a plurality of groups so that each group includes a pair of data elements which are respectively included in the first and second measured data sequences and which are in a corresponding relationship with respect to the thread groove;

detecting an error of the thread groove in the radial direction on the basis of a hal of a sum of the data elements of each group;

detecting an error of the thread groove in the screw axis line direction on the basis of a half of a value, the value obtained by multiplying a difference between the data elements in each group by the cotangent of a contact angle between a ball and the flank; and outputting the detected error in the radial direction and the detected error in the lead direction.

6. An apparatus for measuring the accuracy of a thread groove of a screw including a nut having a ball thread and a screw shaft having an external thread, the apparatus comprising:

means for measuring the coordinates of a plurality of points on each of a pair of flanks of the thread groove along a screw axis line direction;

means for comparing the coordinates of the plurality of points on one flank with the coordinates of the plurality of points on the other flank;

means for selecting, as measurement starting points on the respective flanks, two points respectively on one flank and on the other flank, a distance between the two points in the screw axis line direction being equal to a predetermined axial distance between ball loci on said pair of flanks, the two points having an equal radial distance form the screw axis;

means for measuring a displacement in a depth direction of one point on each of the pair of flanks by moving the position of the one point along a longitudinal direction of the thread groove by means of a one-dimensional displacement detector starting from a corresponding one of the two measurement starting points to thereby obtain a first measured data sequence and a second measured data sequence respectively corresponding to the points on the pair of flanks;

means for grouping the first measured data sequence and the second measured data sequence into a plurality of groups so that each group includes a pair of data elements which are respectively included in the first and second measured data sequences and which are in a corresponding relationship with respect to the thread groove;

means for detecting an error of the thread groove in the radial direction on the basis of a half of a sum of the data elements of each group;

means for detecting an error of the thread groove in the screw axis line direction on the basis of a half of a value, the value obtained by multiplying a difference between the data elements in each group by the cotangent of a contact angle between a ball and the flank; and means for outputting the detected error in the radial direction and the detected error in the thread axis line direction.

7. An apparatus for measuring the accuracy of a thread groove of a screw comprising:

a bed;

a rotating table mounted on the bed and rotated by a motor;

a rotary encoder for detecting an amount of rotation of the rotating table;

a work supporting table mounted on the rotating table for fixing a screw which constitutes an object to be measured so that an axis of the screw corresponds to a rotary axis line of the rotating table;

a vertical slider movable in parallel with the rotary axis line of the rotating table by being guided by a vertical pedestal and by being driven by the motor;

a vertical linear encoder for detecting an amount of movement of the vertical slider;

a measuring mechanism mounted on the vertical slider and movable in a direction orthogonal to the direction of movement of the vertical slider and towards the rotary axis line of the rotating table;

a horizontal linear encoder for detecting an amount of movement of the measuring mechanism;

a one-dimensional displacement detector provided on the measuring mechanism and having a contactor which is allowed to move in a radial direction and to contact with only one flank surface of the thread groove of the screw to be measured;

contactor moving means for moving the displacement detector in accordance with a lead of the screw to be measured while maintaining the contactor of the displacement detector in contact with a pair of flank surfaces of the thread groove individually; and outputting means for periodically storing measured data for each of the flanks obtained by moving the displacement detector by the contactor moving means in synchronism with a rotation of the screw to be measured about the axis thereof, and for outputting thread groove accuracy data represented by an error ($\Delta r$) in a radial direction and an error ($\Delta z$) in a screw axis line direction of the thread groove of the screw obtained by calculating the error ($\Delta r$) and the error ($\Delta z$) from the stored data.

8. The apparatus according to claim 7 wherein the work supporting table includes a centering device for moving the screw to be measured in an X axis direction and a Y axis direction in a horizontal plane, and an inclination adjusting table for adjusting inclination of the screw to be measured with respect to the horizontal plane.

9. The apparatus according to claim 7 further comprising measurement starting point selecting means for selecting measurement starting points on the pair of flanks respectively of the thread groove of the screw at which points the contactor contacts for starting the measurement thereof, the measurement starting points being determined on the basis of measured data of the shape of the cross-section of the thread groove obtained by moving the displacement detector in the screw axis direction and on the basis of the dimension of the screw to be measured.

10. The apparatus according to claim 7 wherein the screw to be measured is a nut having a ball thread, and the measurement starting points are selected to be contact points between a ball and the thread groove.

11. A method for measuring the accuracy of a thread groove of a screw, the method comprising the steps of:

measuring an eccentricity and an inclination of an assembling reference surface of the screw to be measured;

adjusting the measured eccentricity and the inclination of the reference surface by adjusting a work supporting table;

determining a contact position of a contactor of a one-dimensional displacement detector with each of a pair of flank surfaces of a thread groove of the screw to be measured on the basis of the dimensions of the screw;

obtaining a first data sequence by storing measured data of one flank surface for every predetermined amount of rotation of a rotating table by moving the displacement detector in a rotation axis line direction of the rotating table in synchronism with the rotation of the rotating table;

obtaining a second data sequence by storing measured data of the other flank surface for every predetermined amount of rotation of the rotating table by moving the displacement detector in the rotation axis line direction of the rotating table in synchronism with the rotation of the rotating table;

grouping the first data sequence and the second data sequence into a plurality of groups, each of the plurality of groups including a pair of data elements which are respectively included in the first and second data sequences and which are in a predetermined correlation;

obtaining an error in a radial direction of the thread groove on the basis of a half of a sum of data elements of each of the plurality of groups; and obtaining an error in a screw axis line direction of the thread groove on the basis of a half of a value, the value being obtained by multiplying a difference between data elements of each of the plurality of groups by the cotangent of a contact angle between a ball and the thread groove.

12. The method according to claim 11 further comprising the steps of:

subsequent to the step of correcting, again measuring the eccentricity and the inclination of the reference surface, and storing the measured values of the eccentricity and the inclination; and obtaining an average amount of eccentricity, an average direction of inclination, and an average amount of inclination by subtracting the stored measured values of the eccentricity and the inclination of the reference surface from measured values of the screw.

* * * * *